Figure 1:
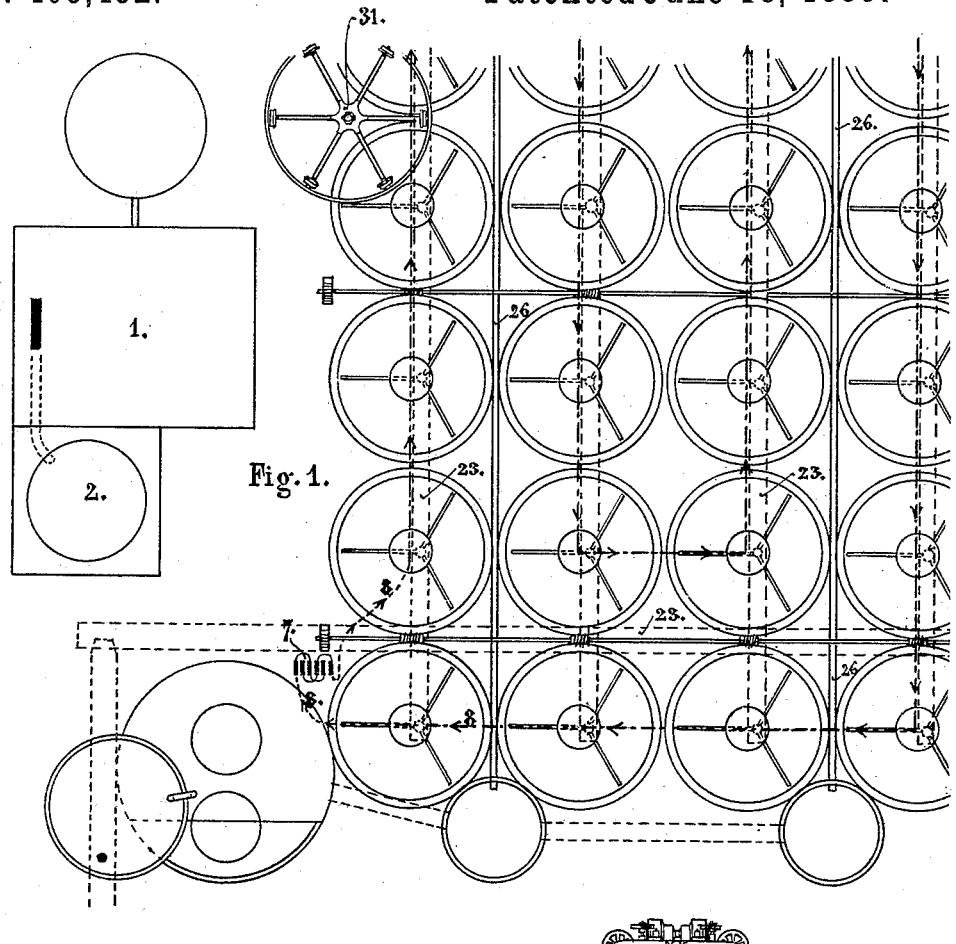

(No Model.) 3 Sheets—Sheet 1.

C. O. YALE.
APPARATUS FOR THE ELECTROLYSIS OF LEAD.

No. 405,452. Patented June 18, 1889.

WITNESSES.
Rich. George.
L. F. Stuart

INVENTOR.
Chas. O. Yale
By Baldwin & Henry
Attys (No Model.)  3 Sheets—Sheet 2.
C. O. YALE.
APPARATUS FOR THE ELECTROLYSIS OF LEAD.
No. 405,452. Patented June 18, 1889.
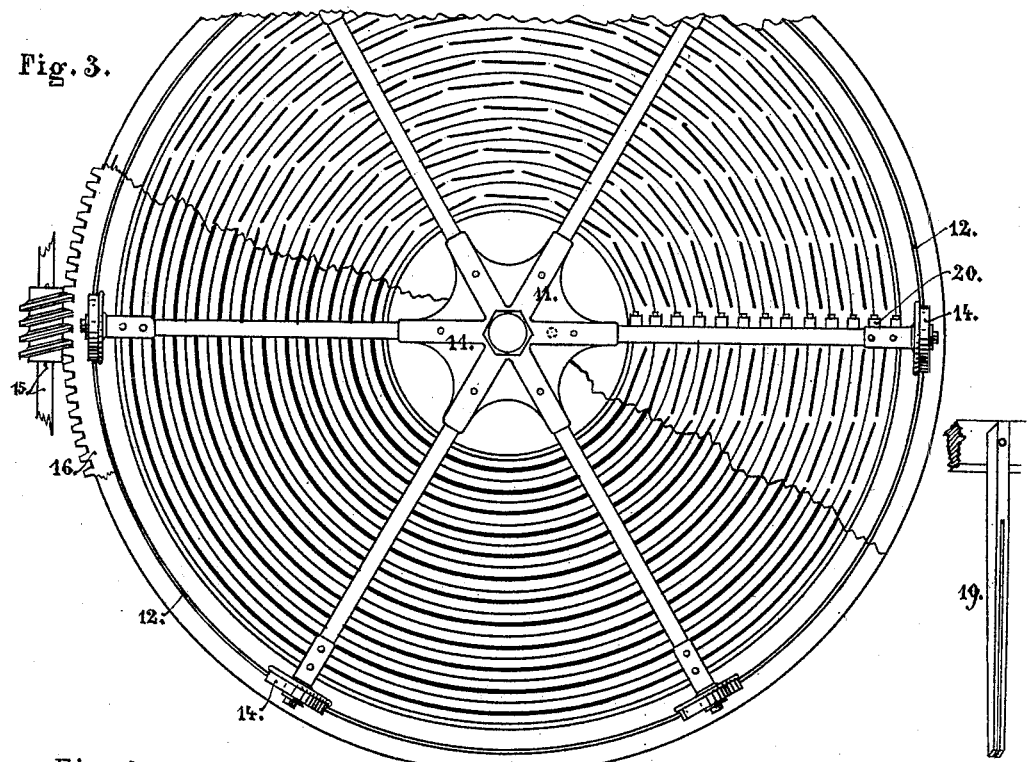
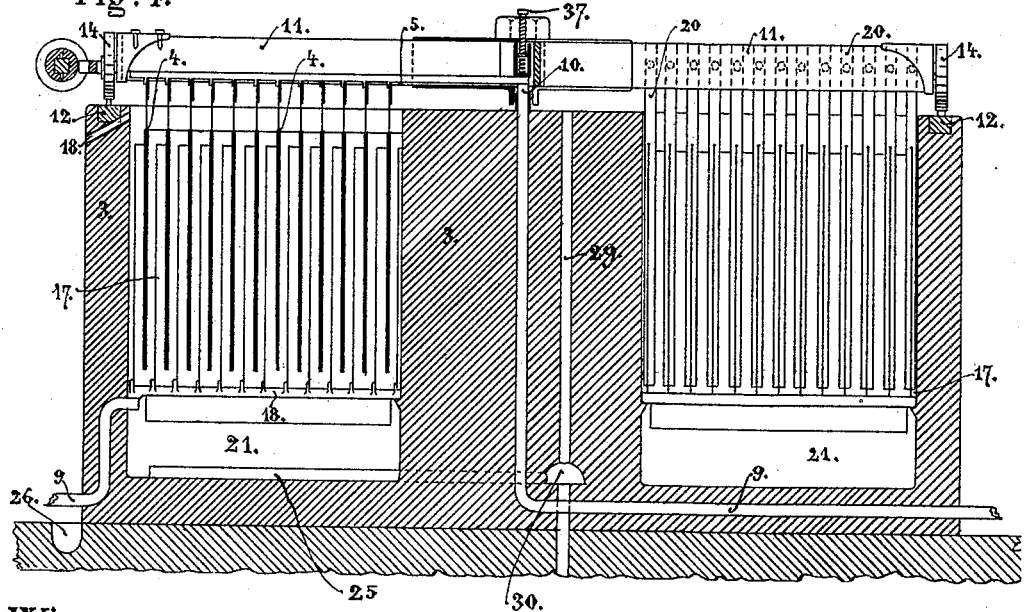
Witnesses.
Rich. George.
L. F. Stuart.
Inventor.
Chas. O. Yale
By Kasley Lewis & Henry
Attys

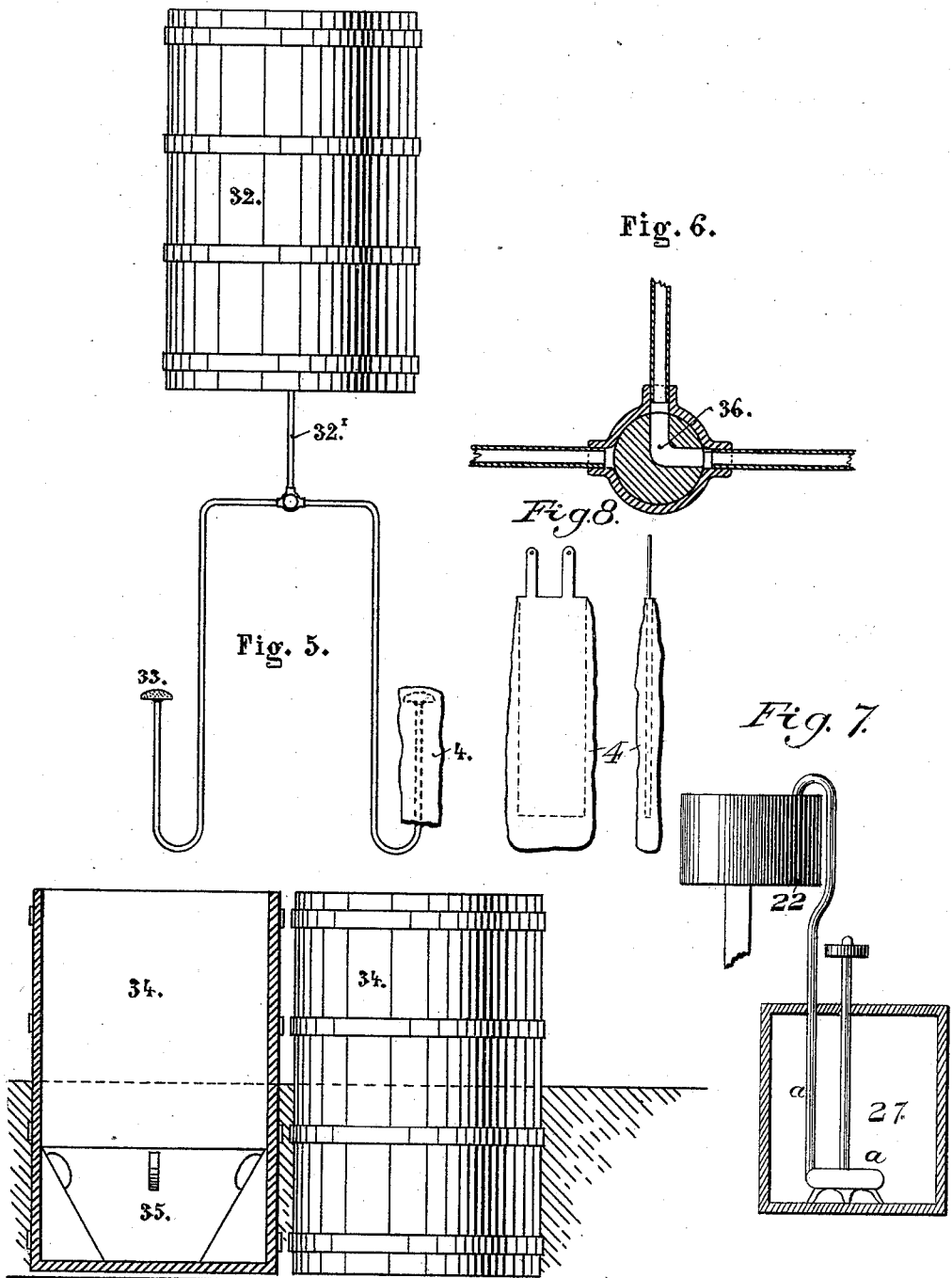

UNITED STATES PATENT OFFICE.

CHARLES O. YALE, OF ROME, NEW YORK, ASSIGNOR OF ONE-HALF TO MOSES M. DAVIS, OF SAME PLACE.

APPARATUS FOR THE ELECTROLYSIS OF LEAD.

SPECIFICATION forming part of Letters Patent No. 405,452, dated June 18, 1889.

Application filed March 8, 1886. Serial No. 194,453. (No model.)

*To all whom it may concern:*

Be it known that I, CHARLES O. YALE, of Rome, in the county of Oneida and State of New York, have invented certain new and useful Improvements in Apparatus for the Electrolysis of Lead; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the mechanism and process for separating argentiferous base bullion into their several constituents by electrolysis; and it consists in the various mechanism hereinafter more fully pointed out and claimed.

By the term "base bullion" is meant certain minerals remaining after reducing the ores by smelting and otherwise, the rock and other worthless matter being eliminated, whereby the metal is freed, leaving, among other constituents, gold, silver, lead, copper, antimony, and such other metallic substances as are found in such ores, about ninety per cent. of the compound being lead. In order to utilize these various metallic ingredients and render the same useful, the compound has to pass through a refining process for the elimination from the lead of all other foreign substance, the residuum after the purified lead is removed being left for treatment by any of the well-known processes for separating the different constituent elements of such residuum. I attain this end—to wit, the separation and purification of the lead from the other constituent elements which enter into the base bullion—by employing in series a system of decomposing-vats circular in form, with a core in the center composed of non-elastic conducting material, inclosing the permanent conductor in the core and vat, in which the base bullion is subjected to decomposition by electrolysis in a solution having the proper electrolytic elements. The decomposing efficiency of the electric current which passes through the series of vats will deposit an equivalent of metal in each vat. I attain this end by keeping the resistance in the series of vats within a given limit, by increasing the conducting capacity of the vats in proportion to their number, by maintaining a continuous movement of the solution, by which a uniform density and temperature in the solution throughout the series of vats is produced, and by providing mechanical means for removing the accumulating deposit from the cathodes, thereby preventing the deposit from forming metallic conductors between the anodes and the cathodes throughout the entire series of vats, and other improvements, hereinafter more fully pointed out and claimed.

Figure 2:
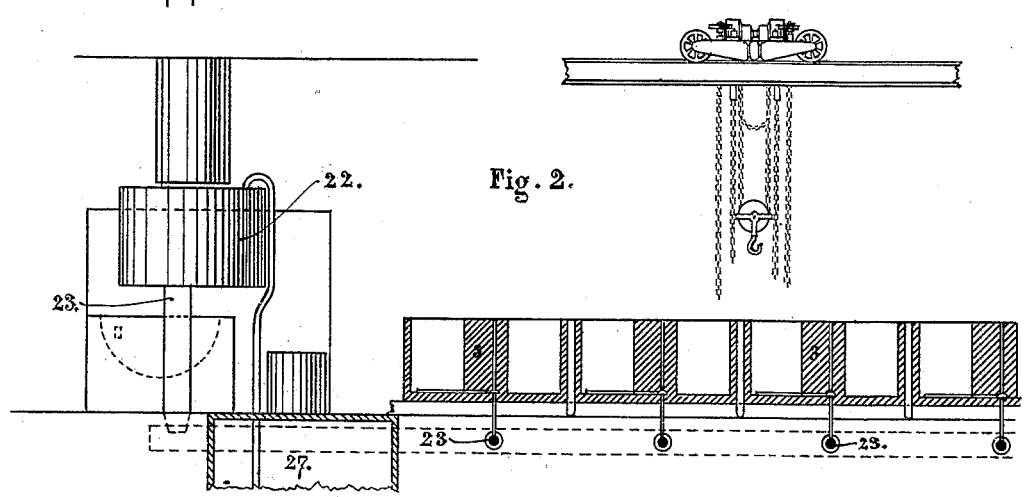

In the accompanying drawings, Figure 1 represents a plan view of a portion of a plant of machinery constructed upon my improved plan. Fig. 2 represents a vertical section of the same on line $x\, x$, Fig. 1. Fig. 3 represents a top view of a portion of a loaded decomposing-vat. Fig. 4 is a vertical section of the same. Fig. 5 represents a view of a bag-washing device, one of the tanks being shown in vertical section. Fig. 6 is a cross-section of a three-way cock. Fig. 7 represents a vertical section of solution-tank 27, with circulating pump $a$ in the bottom of the tank, with connecting-pipe $a'$ connecting with tank 22. Fig. 8 represents a front and an edge view of an anode with a muslin bag inclosing the same, as hereinafter more fully described and claimed.

In the accompanying drawings, similar letters of reference refer to corresponding parts throughout the several views.

I attain the various ends hereinbefore stated and hereinafter pointed out by decomposing the lead bullion in an electrolytic solution of well-known composition.

I take the impure lead as it comes from the smelting-furnace and remelt the same, preferably in a reverberatory furnace, an outline plan being shown in 1, Fig. 1. From this furnace the lead is run to a casting-machine, for which separate Letters Patent will be applied for. I also provide with the furnace an ordinary melting-kettle 2, Fig. 1, for use in melting the purified sponge-lead and running the same into pigs after draining the moisture therefrom.

The impure lead is cast into plates or anodes of about two feet in length, six inches in width, and one-eighth of an inch in thickness. The size, however, may be varied. The plates or anodes are then inclosed in a muslin bag 4, Fig. 5, and a series of them are then electrically attached 4, Fig. 4, to radial electric conductors 5, Fig. 4, which are electrically connected with the positive pole of an electric current 7, Fig. 1, the course of the electric current being indicated by arrows 8, Fig. 1, and the dotted lines. The permanent electric conductor passing into and through a central core in each decomposing-vat; projecting slightly above the center and in contact with the radial conductors 5, forms with the solution and cathodes and conductor 18 a circuit through the vat.

3, Fig. 4, represents the core in the vat. The electric conductor passes through succeeding vats in substantially the same manner as indicated in Fig. 4, forming a complete circuit with the negative pole of the battery. The permanent electric conductors where they pass into and through the vat should be insulated.

9, Fig. 4, represents the permanent conductor, which extends slightly above the top of the vat and terminates at 10, Fig. 4. The permanent conductor at 10 connects with a system of radial conductors 5, Fig. 4, which are attached to or mounted on a system of radial arms 11, Figs. 3 and 4. To these radial conductors are secured annular conductors, to which the plates or anodes incased in a muslin bag are electrically attached, as indicated on the left of Fig. 4. The radial arms on which the radial conductors are mounted are provided with anti-friction rolls 14, Figs. 3 and 4, constructed to travel on track 12, Figs. 3 and 4, provided at the top of the vat, the track being arranged circular in form above the vat. The anti-friction rolls under each radial arm are constructed to travel on the circular track, as shown in Figs. 3 and 4. On the outer surfaces or ends of the radial arm I provide a circular band with gear-teeth on the outer surface, 16 representing a section of the gear, Fig. 3, and worm-gear 15, engaged with the circular gear, both being driven by power through the rotating movement of the worm-gear. By this mechanism the radial arms are driven in a continuous direction. Other means may be used for imparting motion to the radial arms. The electric anodes are suspended from the radial arms and fall inside of the vat, where they are brought in contact with the solution, in which they are moved by the mechanism already described. The anodes, however, are incased in a muslin bag 4, as shown in Figs. 4, 7, and 8, with an intervening space between the two. These cathodes are connected with a conductor 18, Fig. 4, located below the anodes, and form a continuation of the permanent conductor 9, as shown at the left of Fig. 4, connecting with a series of similar vats through the entire system. The vats being filled with solution and the current of electricity applied the decomposition of the lead begins. The decomposed atoms collect and form in the well-known electrolytic process upon the surface of the cathodes a soft spongy deposit, rapidly forming an accumulation which soon reaches the anodes, forming a complete metallic conductor, which seriously arrests the process of decomposition by diverting the current of electricity. To overcome these troubles, I provide a moving combing or brushing device for continually or at stated intervals combing or brushing the surfaces of the cathodes, which comb or brush is formed of any suitable non-conductor of electricity, and should be constructed and operated in such manner as to keep the surfaces of the cathodes substantially free from the deposit. I preferably provide combing and brushing device 19, a series of which are mounted on one of the radial arms in successive order, as illustrated at 20, Fig. 3, and are moved with the radial arms, while the cathodes are held stationary in the vat, the combing or brushing device being mounted on the arms in such position that they will engage the surfaces of the cathodes. The deposit so removed from the cathodes settles to the bottom of the vat into space 21, Fig. 4. It is quite obvious that other forms and construction of combing or brushing device may be used and other means of imparting motion, whereby the surfaces of the cathodes may be freed from the accumulating deposit thereon without departing from the spirit of my invention.

In preparing the solution for use in the vats I preferably provide tank 22, Fig. 2, with a coil of steam-pipe for heating the solution, having reference to the size of the plant and the quantity of the solution to be used. This tank is connected through a system of non-electric conveying-pipes 23, connecting the same with the system of decomposing-vats, and also shown in dotted lines in Fig. 1. Connected with this system of conveying-pipes are similar conveyer-pipes connecting the main system of conveyers with each decomposing-vat. Fig. 2 indicates such connection. The last-named conveyer-pipes connect with the main system of conveyers for discharging the solution into the decomposing-vats at 25, Fig. 4, below the cathodes. I prefer a perforated pipe discharging into or near the bottom of the decomposing-vat. By this means the liquid is diffused throughout the bottom of the decomposing-vat, and is maintained in a continuous flow, the overflow passing out of the top of the vat 18, Fig. 4, where such overflow is discharged into a system of return-drains 26, Fig. 4, which conduct the fluid into receptacle 27, Fig. 2, where the same is again returned to tank 22 for use by an ordinary circulating-pump or any equivalent means, whereby a continuous circulation of the solution is at all times maintained in the vat during the process of electrolysis, thereby maintaining the solution at a uniform temperature and density, which constitutes an important feature of my invention.

Another important feature of my invention consists in having in each vat a central core 3, Fig. 4, whereby all the solution in the vat is utilized without superfluity of solution in the process of electrolysis. At the same time this core serves the purpose of a non-conductor, through which the electric conductor passes. In this core I provide a passage-way 29, Fig. 4, which enables me to insert a plug in the fluid-conveyer for shutting off the flow; this is inserted through an opening in chamber 30, which forms an elbow in the pipe leading from the conveyer to each vat. This becomes necessary when the vats are cleaned or emptied.

Another feature of my invention consists in providing an overhead traveling crane, a section of which is represented in Fig. 2, by means of which the radial arms and the attachments therewith connected may be lifted from the vats and removed to a distant portion of the building, where they may preferably be supported on a vertical post. A top view of the radial arms removed from one of the vats is shown at 31, Fig. 1. This arrangement is provided for convenience in rotating the arms for the removal of the leadless bags and replacement of new anodes and bags. The crane may be used in like manner for removing and replacing the cathodes.

For keeping the radial conductors in contact with the permanent conductors during the process of electrolysis, I provide screw-threaded bolt 37, Fig. 4, by means of which the radial conductors are kept in contact with the main conductor during the progress of the electrolytic process, or a suitable spring may be substituted for the screw-bolt.

Operation: I provide a solution composed of well-known constituents used in electrolysis of lead, which is placed in the tank, from which the same is allowed to circulate through the entire system of decomposing-vats through non-electric conveyer-pipes, from which the same is discharged into the vats below the cathodes, and preferably at the bottom of the vat, where the same is allowed to overflow over the top of the vat, the overflow being conveyed and delivered back into the tank by a system of drains and pumps, where the solution may be again used and a continuous circulation maintained in the fluid throughout the entire process.

I am aware that it is not new to treat ores and metals by electrolysis by the use of cathode compartments having negative pole therein provided with a rotary drum constituting the anode compartment provided with porous material, separating it from the cathode compartment, having a series of carbon rods or plates arranged within the same with suitable electric conductors. This I disclaim.

I am also aware that a system of vats have heretofore been employed in electrolysis, located one above another, provided with means for circulating the fluid in the vats, as employed in reducing zinc ores by the wet process, using slight heat.

I am also aware that pure zinc metal has been precipitated from sulphites by electric currents, and I am also aware that means have been provided for reducing the zinc ores simultaneously in the same or communicating chambers, producing a sulphate from the carbonate ores with the sulphur thrown off from the sulphurite ores. This I do not claim. I am not, however, aware that the decomposition of lead base bullion has been heretofore accomplished and its alloys eliminated by means of electricity passing through a neutral solution, which is kept at a uniform density by the movement of the same from the bottom toward the top of the vat while the processes of decomposition and deposition are going on. I am not aware of the use of a system of scrapers or brushes for clearing the cathodes of the deposition accumulating thereon during the electrolytic process.

What I claim as new, and desire to secure by Letters Patent, is—

1. The combination of the conveyer-pipes opening into the bottom of the decomposing-vats, the decomposing-vats arranged upon substantially the same horizontal plane, return-drains, the central core in the decomposing-vats, radial arms mounted on the central core provided with electric conductors, and the cathodes mounted in the vat and electrically connected.

2. The decomposing-vats provided with a central non-electric conductor-core, in combination with the radial arms mounted above the core having electrical conductors on the radial arms, and the circular cathodes mounted in the vats and electrically connected.

3. The decomposing-vats, in combination with the radial arms mounted to be moved above the vat, provided with electric conductors to connect with the anodes, and the circular cathodes mounted in the vats and electrically connected.

4. The conveyer-pipes connecting with the decomposing-vats, the decomposing-vats, the return-conductors, and the conveyer-pipes opening into the vat through radial pipes in the bottom thereof, in combination with radial arms moving above the vat and provided with electrical conductors to connect with the anodes, and the circular cathodes mounted in the vat and electrically connected.

5. The decomposing-vat arranged to receive the solution at the bottom thereof, in combination with radial arms above the vat for suspending the soluble anodes electrically connected, the cathodes mounted in the vat and electrically connected, and the moving scraper on the surface of the cathodes.

6. The decomposing-vat and the radial arms having electric conductors, in combination with the circular cathodes mounted in the vat and electrically connected, and the brushes mounted on the radial arms to be moved therewith, engaging the opposing sides of the cathodes, substantially as set forth.

7. The combination of a decomposing-vat having a central core therein, the radial arms mounted thereon, and means whereby they may be rotated horizontally, the arms carrying movable conductors connecting with the permanent conductor at the core of the vat, the combing or brushing device mounted on the radial arms, each combing or brushing device consisting of a double brush arranged so that the brushing-surfaces are in opposition with the surfaces of the cathodes, and the circular cathode-plates mounted in the vat and electrically connected.

8. The combination of a circular vat with a core therein, the solution-diffusing conveyers located at or near the bottom of the vat, a permanent electrical conductor in the central core, the radial arms carrying radial conductors connecting with the permanent conductor, the cathodes mounted in the vat and electrically connected, and the brushing device arranged so that they move on the opposite surfaces of the circular cathode-plates.

9. In the mechanism used in electrolysis, the succession of circular cathode-plates arranged in the decomposing-vat and electrically connected, and radial arms above the vat electrically connected, substantially as set forth.

In witness whereof I have affixed my signature in presence of two witnesses.

CHARLES O. YALE.

Witnesses:
EDWIN H. RISLEY,
M. E. ROBINSON.